Oct. 14, 1952     I. SHAPIRO     2,614,225

FILM PACKET FOR USE WITH DENTAL X-RAY MACHINES

Original Filed Oct. 2, 1946

Inventor

By Isadore Shapiro

Wooster & Davis    Attorneys

Patented Oct. 14, 1952

2,614,225

UNITED STATES PATENT OFFICE 2,614,225

FILM PACKET FOR USE WITH DENTAL X-RAY MACHINES

Isadore Shapiro, Albany, N. Y.

Original application October 2, 1946, Serial No. 700,805. Divided and this application June 17, 1950, Serial No. 168,728

4 Claims. (Cl. 250—69)

This invention relates to a film packet for making X-ray photographs of teeth in a patient's mouth, and has for an object to provide a patent of this type so constructed that when used in a holder for positioning the packet in the patient's mouth, such, for example, as the positioning device disclosed in my prior application Serial No. 700,805, filed October 2, 1946, now Patent #2,525,959, for a Device for Positioning X-ray Film to Dental Cone, the film will be automatically centered with respect to the cone of the X-ray machine and the beam of rays projected from said cone.

Another object is to provide a film packet construction in which the films of different widths may all be readily positioned and centered with respect to said cone and the rays projected therefrom.

Since dental films are made of different widths to conform to the varying concave surfaces of the maxillae, the position of each in the film holding and positioning device must be such that the central ray should automatically be centered in projection in each case.

This application is a division of my prior application Serial No. 700,805, above identified.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
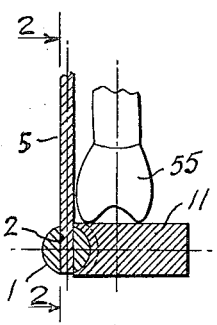
Fig. 1 is a detail section showing a tooth table and associated shaft for mounting the film pack, showing a pack in said shaft and in relation to a tooth on the table.
Figure 2:
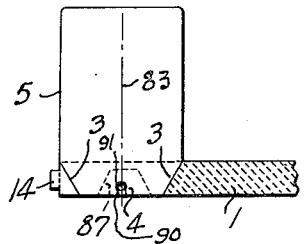
Fig. 2 is a sectional view substantially on line 2—2 of Fig. 1, and showing one form of the film packet in elevation.

As described in said prior application, the film positioning and holding device comprises a central shaft 1 of any suitable material, provided at one end with a transverse slot 2 tapered at its opposite ends 3 to receive the correspondingly tapered end 4 of the film packet 5. This shaft is mounted in a suitable supporting open-sided cylinder (not shown) on which is an extension forming a bite plate or tooth bite block 11 at one side of shaft 1. The shaft is provided with a reduced end 14 to form a bearing for this end of the shaft. The film packet is snugly held in the slot 2, both in properly positioning and locating it in the mouth adjacent the teeth and gums to be X-rayed, and also to hold it in this position during exposure. As describe in said prior application, the apparatus is used by inserting the film packet in the slot 2 in the shaft 1 and positioning it in the mouth with the aid of the associated devices described, and then having the patient bite onto the block or plate 11 after the film 5 is positioned against the back of the teeth or gums or tissue.

A special film packet is designed for use in this device, although the regular film packet, as indicated at 5, may be used. This film packet has an extension 71 with inclined ends 72 to fit the inclined ends 3 of the slot 2 in the shaft 1. By using this extension it can always be made of the same length with the same taper, regardless of the width and length of the film packet, and therefore film packets of different widths and lengths, as indicated by the dotted lines 73 to 82, of Figs. 5 to 8 may be used, each having the extension 71 to fit the slot 2 of the shaft 1, and the center line of each film located on the center line of the extension, as indicated at 83 in each instance. Any one of these packets of the shape and size indicated, when the tapered extension is inserted in the slot, will be automatically centered with respect to the slot and also with respect to a center line or locating mark (not shown) on bite block or tooth table 11, and therefore when located in the mouth with this device and the cone positioned and aligned therewith as pointed out above, the center ray of the X-ray machine cone will always be in the center of the film for most accurate results and least distortion of the image.

Figure 3:
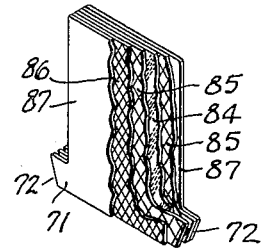
Fig. 3 is a perspective broken view of an improved film packet which may be used for this device.
Figure 4:
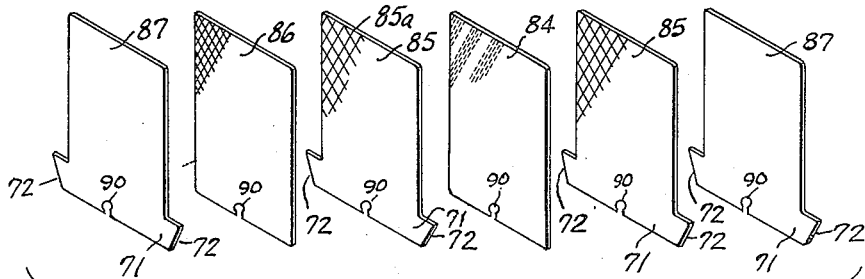
Fig. 4 is an exploded view of the film packet of Fig. 3 showing the different elements in perspective.
Figure 9:
Fig. 9 is an edge view of the lower end of a film packet.
Figure 10:
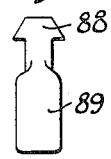
Fig. 10 is a side view of an instrument which may be used for opening the packet.
Figures 5, 6:
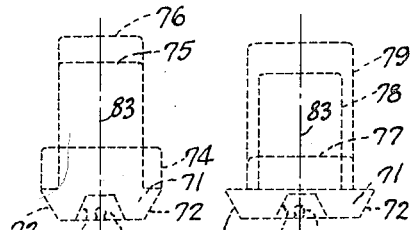
Figs. 5, 6, 7 and 8 are views showing the different shapes and sizes of film packets which may be used.
Figures 7, 8:
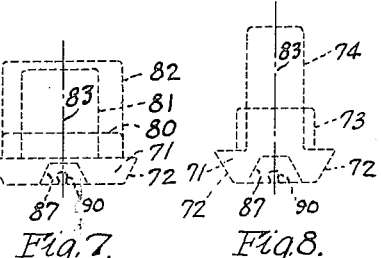

In the film packet of Figs. 3 and 4, the intermediate element 84 is a sensitized film on the opposite sides of which are black sheets 85 of plastic or Celluloid to keep out light and give rigidity to the packet, or one of these may be plastic and the other black paper, depending on how much of this property of rigidity is desired. Back of the rear sheet 85a is the lead foil 86 to stop the X-rays, and this extends to the bottom of the sheets 85. The film 84 also extends to the bottom of the sheets. Outside of the forward plate 85 and the foil 86 are the outside wrappers 87 which may also be black paper. Each of the outside wrappers 87 and the plates 85 are extended at their lower ends to form the extension 71, as indicated, which, when the elements are all assembled may fit snugly in the slot 2 in the shaft 1 and be properly positioned and centered by the inclined ends 3 and 72, and the packet will be held rigid and flat because of the rigidity imparted by the elements 85. To facilitate properly locating and centering the film packet it may be provided with a notch 90 preferably shaped as an eyelet, to snap over a pin 91 extending across the slot. This would also prevent the film from slipping out of the slot while the operator is inserting the positioning device in the mouth.

To facilitate opening of the packet for developing the film after exposure, it may be provided at its lower end with a thin tapered socket 87 extending inwardly from its lower edge between elements 85 and 86 and tapered to receive a similarly tapered head piece 88 of a small tool 89. It may have a substantially flat handle so that after insertion of the head 88 in the socket 87 it may be turned or pried laterally to separate the elements enclosing the film 84, or in other words opening the packet, so that the film may be easily removed for developing. The edge of film 84 may be sealed with edges of sheets 85 with a rigid binder, such, for example, as shellac or a plastic cement, which by its beaded effect creates the equivalent of a metal reinforcement, imparting additional rigidity to the film. It would not include elements 86 and 87, thus permitting insertion of key 88, so the packet could still be pried apart.

It will be clearly understood from the above that it is a simple matter to slip the film packet in the holding slot in the shaft and that this action automatically properly positions it therein, and it will be rigidly held in this proper position. Then the packet may be inserted in the mouth at the back of the teeth to be X-rayed and after the patient has bitten on the block 11 and the film released, it is automatically positioned at the back of the teeth and held in this position by the positioning and mounting device.

Having thus set forth the nature of my invention, I claim:

1. A film packet for photographing teeth in a patient's mouth comprising a sensitized film enclosed in a protecting covering, said packet including a body portion and a lower edge portion adapted to seat snugly in a slot in a supporting shaft, the ends of said edge portion being inclined downwardly and inwardly in opposite directions to seat on similarly inclined ends of said slot to position the packet in the slot with the body portion extending laterally from the shaft, said inclined ends of the film being located equal distances on opposite sides of the center of the film so that when seated in the slot the film is centered in the slot by the inclined walls of the packet and the slot.

2. A film packet for photographing teeth in a patient's mouth comprising a sensitized film enclosed in a protecting covering and including an edge portion adapted to seat snugly in a slot in a supporting shaft, the ends of said edge portion being inclined in opposite directions to seat on similarly inclined ends of said slot, one edge of the packet being provided with a flat recess between the covering on opposite sides of the film adapted to receive a similarly shaped end of a tool to pry the covering apart to release the film for developing after exposure.

3. A film packet for photographing teeth in a patient's mouth comprising a sensitized film enclosed in a protective covering, said packet including a body portion and a lower edge portion adapted to seat snugly in an elongated slot in a supporting shaft, the end edges of said lower edge portion being inclined downwardly and inwardly toward each other in opposite directions to seat on similarly inclined ends of said slot to position the packet in the slot with its body portion projecting laterally from the shaft.

4. A film packet for photographing teeth in a patient's mouth comprising a sensitized film enclosed in a protective covering, said packet including a body portion and a lower edge portion adapted to seat snugly in an elongated slot in a supporting shaft, at least one end edge of said lower edge portion being inclined downwardly and inwardly to seat on a similarly inclined end of said slot to position the packet in the slot with its body portion projecting laterally from the shaft.

ISADORE SHAPIRO.

REFERENCES CITED

The following references are of record in the file of this patent:

UNITED STATES PATENTS

| Number | Name | Date |
|---|---|---|
| 1,571,145 | Schlappi | Jan. 26, 1926 |
| 2,021,190 | Malkasian | Nov. 19, 1935 |
| 2,090,933 | Bolin | Aug. 24, 1937 |
| 2,392,109 | Vlock | Jan. 1, 1946 |